（12） United States Patent
Belanger et al.

(10) Patent No.: US 9,183,657 B2
(45) Date of Patent: Nov. 10, 2015

(54) COMPOSITION MANAGER CAMERA

(71) Applicant: 2236008 Ontario Inc., Waterloo (CA)

(72) Inventors: Etienne Belanger, Kanata (CA); Adrian Nita, Kanata (CA); Adrian Boak, Woodlawn (CA); Michael Alexander Van Reenen, Richmond (CA); Neil John Graham, Ottawa (CA)

(73) Assignee: 2236008 Ontario Inc., Waterloo, Ontario ( * ) Notice: Subject to any disclaimer, the term of this patent is extended or adjusted under 35 U.S.C. 154(b) by 0 days.

(21) Appl. No.: 14/504,068

(22) Filed: Oct. 1, 2014

(65) Prior Publication Data

US 2015/0022621 A1  Jan. 22, 2015

Related U.S. Application Data

(63) Continuation of application No. 13/591,574, filed on Aug. 22, 2012, now Pat. No. 8,878,862.

(51) Int. Cl.
| G09G 5/36 | (2006.01) |
| G06T 11/60 | (2006.01) |
| G06F 3/14 | (2006.01) |
| G09G 5/00 | (2006.01) |
| G06T 1/20 | (2006.01) |
| H04N 1/00 | (2006.01) |
| H04N 5/262 | (2006.01) |

(52) U.S. Cl.
CPC ............. *G06T 11/60* (2013.01); *G06F 3/1423* (2013.01); *G06T 1/20* (2013.01); *G09G 5/001* (2013.01); *G09G 5/363* (2013.01); *H04N 1/00209* (2013.01); *H04N 5/262* (2013.01); *G06T 2200/32* (2013.01); *G09G 2340/0492* (2013.01); *G09G 2340/10* (2013.01); *G09G 2370/12* (2013.01)

(58) Field of Classification Search
CPC ............. G06T 1/60; G06F 13/00; G09G 5/00
USPC ................... 345/530, 536, 619, 629
See application file for complete search history.

(56) References Cited

U.S. PATENT DOCUMENTS

| 7,224,731 B2 | 5/2007 | Mehrotra |
| 7,333,134 B2 | 2/2008 | Miyamoto |
| 7,570,878 B2 | 8/2009 | Kodaira et al. |
| 7,675,545 B2 | 3/2010 | Hsiao et al. |

(Continued)

FOREIGN PATENT DOCUMENTS

JP   2006-171274   6/2006

OTHER PUBLICATIONS

Extended European Search Report, dated Feb. 5, 2013, pp. 1-7, European Patent Application No. 12181384.4, Eurpoean Patent Office, Munich, Germany.

*Primary Examiner* — Jacinta M Crawford
(74) *Attorney, Agent, or Firm* — Brinks Gilson & Lione

(57) ABSTRACT

A system and method may be provided to access images through a camera service, where the images are generated by a non-sensor image source, such as a composition manager. The system may include the camera service and the non-sensor image source. The non-sensor image source may generate a processed image from a source other than a sensor. The camera service may provide the processed image generated by the non-sensor image source to an image consuming application.

10 Claims, 2 Drawing Sheets

(56) References Cited

U.S. PATENT DOCUMENTS

| | | |
|---|---|---|
| 8,049,751 B2 | 11/2011 | Knighton et al. |
| 8,120,662 B2 | 2/2012 | Edwards et al. |
| 8,169,449 B2 * | 5/2012 | Turcotte et al. ............... 345/629 |
| 2002/0039099 A1 | 4/2002 | Harper |
| 2004/0117822 A1 | 6/2004 | Karaoguz et al. |
| 2004/0263663 A1 | 12/2004 | Lee et al. |
| 2005/0129385 A1 | 6/2005 | Speasl et al. |
| 2007/0103567 A1 | 5/2007 | Wloka |
| 2008/0124694 A1 | 5/2008 | Miller et al. |
| 2009/0102861 A1 * | 4/2009 | Turcotte et al. ............... 345/629 |
| 2009/0195556 A1 * | 8/2009 | Turcotte et al. ............... 345/629 |
| 2010/0104207 A1 * | 4/2010 | Chan et al. .................... 382/253 |
| 2010/0231754 A1 * | 9/2010 | Wang et al. .............. 348/231.99 |
| 2011/0205332 A1 | 8/2011 | Jeong et al. |
| 2011/0225366 A1 | 9/2011 | Izadi et al. |
| 2011/0264709 A1 | 10/2011 | Beardsmore et al. |
| 2012/0039391 A1 | 2/2012 | Frusina et al. |
| 2012/0081578 A1 | 4/2012 | Côté et al. |
| 2014/0055475 A1 | 2/2014 | Belanger et al. |

* cited by examiner

COMPOSITION MANAGER CAMERA

This application is a continuation application of, and claims priority to, U.S. non-provisional application Ser. No. 13/591,574, filed Aug. 22, 2012, which issued as U.S. Pat. No. 8,878,862 on Nov. 4, 2014.

BACKGROUND

1. Technical Field

This application relates to graphics buffers and, in particular, to accessing graphics buffer.

2. Related Art

Graphics systems may have multiple software applications that generate content. The content from the software applications may be composited together into a single graphic. The composition may occur in software, hardware or a combination of both.

BRIEF DESCRIPTION OF THE DRAWINGS

The embodiments may be better understood with reference to the following drawings and description. The components in the figures are not necessarily to scale.

DETAILED DESCRIPTION

A system may access images through a camera service, where the images are generated by a non-sensor image source instead of a camera. The system may include an image buffer, the camera service, and the non-sensor image source that populates the image buffer. The non-sensor image source may generate an image from sources other than a sensor. One example of the non-sensor image source is a composition manager, which may include a processor that generates a processed image in the image buffer based on an application image, where the application image is rendered in an application buffer by a first application. The camera service may receive a request from a second application to select an image source from which to receive graphics content. The image source may be selected from among a set of possible image sources, such as from a set that includes the non-sensor image source and a camera. The camera service may provide the graphics content in the image buffer to the second application based on a selection of the non-sensor image source as the image source by the second application.

Because the camera service may provide the graphics content from the non-sensor image source to an application, the camera service may facilitate the application receiving a screen shot, a screen capture video, or some other type of image generated by the non-sensor image source. For example, the composition manager may generate the screen shot or the screen capture video in the image buffer, and the camera service may provide the screen shot or the screen capture video to the application in a desired format.

Alternatively or in addition, the camera service may facilitate spanning or mirroring of displays by providing the graphics content from the non-sensor image source to a remote display driver. For example, the image buffer of the non-sensor image source may be a writeback buffer, the camera service may provide the graphics contents of the writeback buffer to the remote display driver, and the remote display driver may encode the graphics content in a video stream that is transmitted to an external or remote display device.

In some examples, a second display may be supported by selecting a media player as the non-sensor image source. The media player may provide a video stream to the camera service, and the camera service may provide the video stream to an application that encodes and transmits the video stream to an external or remote display device. The media player may provide a different display image for an integrated display. For example, the display image for the integrated display may include a graphical user interface to control the video stream that is provided to the external or remote display device.

Figure 1:
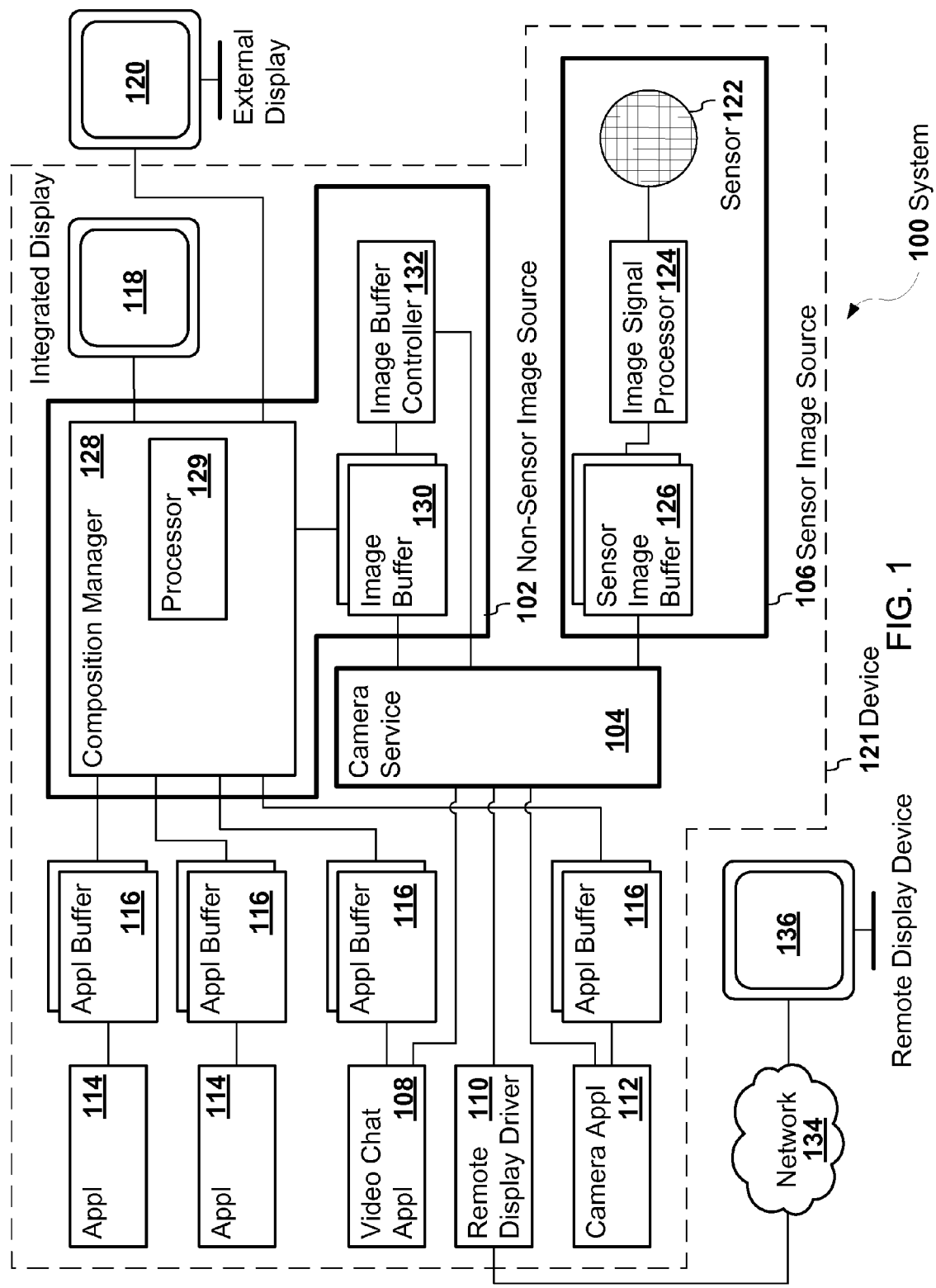
FIG. 1 illustrates a system for accessing images generated by a non-sensor image source through a camera service.

FIG. 1 illustrates a system 100 for accessing images through a camera service 104 that are generated by a non-sensor image source 102. In addition, the system 100 may provide access to images generated by a sensor image source 106, such as a camera.

The system 100 may include the camera service 104 and one or more image sources 102 and 106, such as the non-sensor image source 102 and the sensor image source 106. The system 100 may also include: applications 108, 110, and 112 that obtain images through the camera service 104; applications 114 that do not use the camera service 104; application buffers 116; an integrated display 118; and an external display 120.

One or more components of the system 100 may be included in a device 121, such as a mobile computing device or any other type of computing device. For example, the applications 114, 108, 110, and 112, the application buffers, 116, the camera service 104, the sensor image source 106, the non-sensor image source 102, and the integrated display 128 may be included in the device 121.

The sensor image source 106 may be any component that generates an image from a sensor 122. Examples of the sensor image source 106 include a camera, an integrated camera, an external camera, a video camera, an infrared camera, a thermal imaging device, a web cam, a scanner, a facsimile machine, or any other component that may generate the image from the sensor 122.

The sensor image source 106 may include the sensor 122, an image signal processor 124, and a sensor image buffer 126. The sensor 122 may be any type of sensor that detects light, heat, or any other physical characteristics from which the sensor image source 106 may generate an image. The image signal processor 124 may be any processor that converts signals generated by the sensor 122 into an image represented in the sensor image buffer 126.

In contrast, the non-sensor image source 102 may be any component that generates and/or includes an image from sources other than a sensor. For example, the non-sensor image source 102 may include an application display component or other type of image processor. The non-sensor image source 102 does not include devices that merely read image data from a storage medium, such as optical drives, hard drives, and flash drives. Alternatively, the non-sensor image source 102 may be any software or hardware component that generates, renders, or decodes graphic images. For example, the non-sensor image source 102 may include an application 116, such as Microsoft Word, POWERPOINT® (a registered trademark of Microsoft Corporation of Redmond, Wash.), or PHOTOSHOP® (a registered trademark of Adobe Systems Incorporated of San Jose, Calif.) that populates a corresponding application buffer 116. Additional examples of the non-sensor image source 102 may include an HTML (Hypertext Markup Language) rendering engine, such as WEBKIT® (a registered trademark of Apple Inc., Cupertino Calif.), a YOUTUBE® (a registered trademark of Google Inc. of Mountain View, Calif.) HTML5 (Hypertext Markup Language version 5) player, or a video decoding application or engine, such as a FLASH® (a registered trademark of Adobe Systems Incorporated of San Jose, Calif.) player. Alternatively or in addition, the non-sensor image source 102 may be, or include, memory, such as a buffer, a cache, or a storage medium.

The application display component may be any component that generates the image from an application image and/or a graphical user interface (GUI), where the application image and/or the GUI is generated by one or more of the applications 114, 108, and 112, the image generated is to be displayed. For example, the application display component may include a composition manager 128. The composition manager 128 may be any component that generates a composite image for display on a display device, such as the integrated display 118 and/or the external display 120. In particular, the composition manager 128 may generate the composite image by combining application images represented in the application buffers 116 and rendered by the applications 114, 108, and 112. The composition manager 128 may include one or more processors 129, such as a Central Processing Unit (CPU), a Graphics Processing Unit (GPU), a 2D (two-Dimensional) engine, and/or a display controller.

In addition to or instead of the composition manager 128, the application display component may include a different type of application display component. For example, the application display component may be a window manager, a display controller, or a graphics converter implemented in software or hardware. The application display component may include a processor that modifies pixel data read from the application buffer(s) 116 in any number of ways when generating the image for display. For example, the application display component may include a processor that converts a color space of pixels of the application image and/or a combination of the application images when generating the image from the application image and/or the combination of the application images. Alternatively or in addition, the application display component may include a processor that resizes pixel data of the application image and/or the combination of the application images; crops the pixel data; blits the pixel data; and/or filters the pixel data.

The non-sensor image source 102 may include the composition manager 128 and/or any other type of application display component. In addition, the non-sensor image source 102 may include an image buffer 130 and an image buffer controller 132.

The image buffer 130 may be memory in which the image generated by the non-sensor image source 102 is stored. For example, the image buffer 130 may be a writeback buffer populated by the composition manager 128. The writeback buffer may be a buffer populated by a hardware component of the composition manager 128, where the data stored in the buffer represents an image output by the hardware component as a byproduct of the generation of the image for display. The writeback buffer may represent the composite image. Alternatively, the writeback buffer may represent an image that is derived from the composite image, such as an off-screen portion of one or more of the application images. Alternatively, the writeback buffer may represent some other image, such as the application image generated by one of the applications 114.

The image buffer controller 132 may be any component that controls characteristics of the image represented in the image buffer 130 and/or processes the contents of the image buffer 130 before delivering the processed contents to the camera service 104. The image buffer controller 132 may be a component separate from the application display component or, alternatively, included in the application display component. For example, the image buffer controller 132 may be separate from the composition manager 128, or alternatively, included in the composition manager 128.

The camera service 104 may be any component that provides access to the image sources 102 and 106 through a camera-oriented interface to one or more image consuming applications, such a video chat application 108, a remote display driver 110, and a camera application 112. The camera service 104 may execute as part of a process that invokes the camera service 104. Alternatively or in addition, the camera service 104 may execute as a background process, a web service, or as any other type of process.

The camera-oriented interface may include an implementation of a camera API (Application Programming Interface). The camera API may provide a unified view of the image sources 102 and 106 that treats each of the image sources 102 and 106 as a camera even if the respective image source 102 and 106 is not a camera. In addition, the camera API may provide access to the image sources 102 and 106 that is specific to one or more types of the image sources 102 and 106.

The camera API may include a camera-oriented interface through which the image consuming application 108, 110, or 112 may select the image source 102 or 106 from which to receive graphics content. Alternatively or in addition, the camera API may provide a camera-oriented interface through which the image consuming application 108, 110, or 112 may receive the graphics content. Alternatively or in addition, the camera API may provide a camera-oriented interface through which the image consuming application 108, 110, or 112 may specify a target format in which to receive the graphics content. The camera API may provide the graphics content to the image consuming application 108, 110, or 112 in the target format specified.

The applications 108, 110, and 112 that receive graphics content through the camera service 104 may include, for example, a video chat application 108, a remote display driver 110, and a camera application 112. The applications 108, 110, and 112 that receive graphics content through the camera service 104 may include additional, fewer, or different applications.

The camera application 112 may be any application that provides a GUI through which a user may take a picture and/or stream a video received from a camera through the camera service 104. An example of the camera application 112 is a mobile app entitled "Camera" on a mobile device, such as an IPHONE®, which is a registered trademark of Apple Inc. of Cupertino, Calif., and a device running the ANDROID™ operating system, which is a trademark of Google, Inc. of Mountain View, Calif.

The remote display driver 110 may be a component that provides a video stream and/or a static image to a remote display device 136, where the remote display driver 110 receives the static image and/or the video stream or sequence of images through the camera service 104 from the selected image source 102 or 106. The remote display device 136 may be any electro-optical device for displaying data, such as a light emitting diode (LED) display, a liquid crystal display (LCD), a cathode ray tube (CRT), an electro-luminescent display, a plasma display panel (PDP), a vacuum florescent display (VFD), a projector, or any other display device. The remote display driver 110 may transmit the static image and/or the video stream to the remote display device 136 over a network 134 and/or over cabling, such as an HDMI® (High-Definition Multimedia Interface) cable (HDMI is a registered trademark of HDMI LICENSING L.L.C. of Sunnyvale, Calif.). The network 134 may include a local area network (LAN), a wireless local area network (WLAN), a WI-FI® (a registered trademark of Wireless Ethernet Compatibility Alliance, Inc. of Austin, Tex.) network, a personal area network (PAN), a wide area network (WAN), the Internet, an Internet Protocol (IP) network, a DLNA® (Digital Living Network Alliance) network (DLNA is a registered trademark of the Digital Living Network Alliance of Lake Oswego, Oreg.), any other communications network, or any combination thereof. In some examples, the remote display device 136 may be a WI-FI® display. In a different example, the remote display device 136 may be a monitor and/or a television that receives the video stream and/or the static image over an HDMI cable.

The video chat application 108 may be a component that provides a user interface through which a user may communicate with other users over audio and/or video channels. The video chat application 108 may, for example, communicate between two or more devices using Voice over Internet Protocol (VoIP) or any other voice communication protocols, such as any of International Telecommunications Union (ITU) standards H.320, H.264, H.324 or V.80.

During operation of the system 100, each of the applications 114, 108, and 112 that generates a respective application image may render the respective application image in the corresponding application buffer 116. The applications 114, 108, and 112 that generate the application images may include a set of the applications 114 that generate a GUI and do not use the camera service 104. Alternatively or in addition, the applications 114, 108, and 112 that generate the application images may include a set of the applications 108 and 112 that generate a GUI and use the camera service 104, such as the video chat application 108 and the camera application 112. For example, the video chat application 108 may render a GUI in the application buffer 116 corresponding to the video chat application 108. The GUI rendered by the video chat application 108 may be a user interface through which a user may control the video chat application 108.

The application display component, such as the composition manager 128, may generate a processed image in the image buffer 130 from the application images that are represented in the application buffers 116. For example, the composition manager 128 may generate a composite image in the image buffer 130 that is a composition of the application images represented in the application buffers 116. The composition manager 128 and/or additional hardware may cause the composite image to be displayed on a display device, such as the integrated display 118 and the external display 120. Alternatively, the processed image represented in the image buffer 130 may be an image different than the composite image. For example, the processed image may be an off-screen portion derived from one or more of the application images.

Any of the applications 108 110, and 112 may communicate with the camera service 104 and select the non-sensor image source 102 as the image source. For example, the remote display driver 110 may select the non-sensor image source 102 as the image source through the camera service 104. By selecting the non-sensor image source 102, the remote display driver 110 may receive an image and/or a video from the non-sensor image source 102 as if the non-sensor image source 102 were a camera. When the non-sensor image source 102 is the application display component, such as the composition manager 128, the image buffer 130 may represent the composite image displayed in the integrated display 118. When the image buffer 130 represents the composite image, the remote display driver 110 may receive a screen snapshot and/or a screen capture video from the application display component through the camera service 104. The remote display driver 110 may transmit the screen snapshot and/or the screen capture video to the remote display device 136, thereby mirroring the image displayed on the integrated display 118 to the remote display device 136.

Alternatively or in addition, the video chat application 108 may implement a "share my screen" feature or "share an application" feature by selecting the application display component, such as the composition manager 128, as the image source from which to receive the graphics content through the camera service 104. The "share my screen" feature shares the content of the image displayed on the integrated display 118 with devices on the network 134. The "share an application" feature shares the content of the application image generated by one or more of the applications 114, 108, and 112 with devices on the network 134.

When the image buffer 130 represents the image on the integrated display 118, then the video chat application 108 may receive a screen snapshot and/or a screen capture video from the application display component through the camera service 104. The video chat application 108 may communicate the screen snapshot and/or the screen capture video received from the camera service 104 to one or more remote devices as part of an implementation of the "share my screen" feature.

When the image buffer 130 represents the application image generated by one of the applications 114, 108, or 112, then the video chat application 108 may receive a screen snapshot and/or a screen capture video of the application image from the application display component through the camera service 104. The video chat application 108 may communicate the screen snapshot and/or the screen capture video of the application image received from the camera service 104 to one or more remote devices as part of an implementation of the "share an application" feature.

The image buffer controller 132 may control what type of image is represented in the image buffer 130. For example, the video chat application 108 may direct the image buffer controller 132 directly, indirectly through the camera service 104, or indirectly through some other component, to populate the image buffer 130 with the composite image. Alternatively, the video chat application 108 may direct the image buffer controller 132 directly, indirectly through the camera service 104, or indirectly through some other component, to populate the image buffer 130 with the application image.

The image consuming application 108, 110, or 112 may select the image source 102 or 106 by sending a request that is received by the camera service 104. The request may be any type of request, such as a SOAP (Simple Object Access Protocol) request or a local invocation of a programmatic procedure within a thread or a process.

In one example, the image consuming application 108, 110, or 112 may select the image source 102 or 106 with a factory class through which a programming object may be instantiated. The image source 102 or 106 may be identified in an invocation of a programmatic procedure of the factory class with an image source identifier that identifies the image source 102 to select. In a second example, the image consuming application 108, 110, or 112 may select the image source 102 or 106 by invoking a programmatic procedure on a previously instantiated programming object and passing the image source identifier of the image source 102 as a parameter.

The instantiated programming object may be specific to the image source 102 or 106 identified by the image source identifier. Programmatic procedures and/or properties of the instantiated programming object may be common to all types of the images sources 102 or 106, and/or be specific to a subset of the types of the image sources 102 or 106. For example, the target format in which to receive the graphics content may be specified in one or more programmatic procedures and/or properties of the instantiated object. Table 1 below describes an example of selecting the image source 102 or 106 with the camera API, receiving the graphics content from the image source 102 or 106 with the camera API, and specifying a target format of the graphics content to be received with the camera API.

TABLE 1

Code for Selecting and Using the Non-Sensor Image Source

```
// Create a camera object
var camera = camera.factory.create("CompositionMgr.Camera");
// Capture an image
var image = camera.captureImage(function(media) {
  uploadImage(media.content);
});
// Capture a video, specifying a desired duration.
var video = camera.captureVideo(function(media) {
  uploadVideo(media.content);
}, 5000);
```

The code in Table 1 describes using a create procedure to instantiate a camera object. A parameter of the create procedure may select the image source 102 or 106. The procedures of the instantiated camera object may be invoked by the image consuming application 108, 110, or 112 to receive graphics content from the camera service 104 and/or to communicate with the camera service 104.

The code in Table 1 describes using a captureImage( ) procedure of the instantiated object to receive a single image from the image source 102 or 106. The camera object is the instantiated programming object. The captureImage( ) is an example of a programmatic procedure on the camera API that causes a picture to be taken or captured when the programmatic procedure is invoked and the image source 106 selected is a camera.

The code in Table 1 also describes using a captureVideo( ) procedure of the instantiated object to receive a video stream. The captureVideo( ) is an example of a programmatic procedure on the camera API that causes a video capture to begin when the programmatic procedure is invoked and the image source 106 selected is a camera.

The code in Table 1 further describes specifying a desired duration of the video stream by passing the desired duration (5000 milliseconds in the example code listing of Table 1) as a parameter of the captureVideo( ) procedure. A target format of the video stream may be specified in any number of ways, such as in one or more image specification parameters. The image specification parameters may be passed as parameters to the captureVideo( ) procedure or in some other programmatic procedure. The image specification parameters may include, for example, a memory location of the processed image, a pixel format of the processed image, a timestamp of the processed image, an indication of the availability of the processed image, and/or any other type information about the processed image or the graphics content received from the camera service 104 by the image consuming application 108, 110, or 112.

The camera API may be implemented in many different ways. For example, the image consuming application 108, 110, and 112 may select the image source to be one of multiple image buffers 130 within the non-sensor image source 102 and/or one of multiple sensor image buffers 126 of the sensor image source 106. Each one of the image buffers 130 in the non-sensor image source 102 may include a different image than any of the other image buffers 130 in the non-sensor image source 102. The image source identifier may identify which of the image buffers 130 is to be the image source 102. The image source identifier may include a name, a number, and/or any other type of identifier.

The camera service 104 may select one of the image sources 102 and 106 that is different than the non-sensor image source 102 when the image source identifier does not identify a buffer populated by the non-sensor image source 102. For example, the camera service 104 may select a default image source, such as an integrated camera, whenever the image source identifier does not identify a buffer populated by the non-sensor image source 102.

The system 100 may include additional, fewer, or different components than illustrated in FIG. 1. For example, the system 100 may include just include the camera service 104. In another example, the system 100 may include the components in the device 121 as illustrated in FIG. 1, but not any of the components external to the device 121, such as the external display 120, the network 134, and the remote display device 136. In yet another example, the system 100 may include just the camera service 104 and the remote display driver 110.

The system 100 may include a non-sensor image source device and/or a sensor image source device. The non-sensor image source device may be the non-sensor image source 102 when the non-sensor image source 102 comprises hardware or firmware. The sensor image source device may be the sensor image source 106 when the sensor image source device 106 comprises hardware or firmware.

Each of the components of the system 100 may include additional, fewer, or different components than illustrated in FIG. 1. For example, the non-sensor image source 102 may include just a hardware compositor that includes the image buffer 130 but not the image buffer controller 132. In another example, the camera service 104 may include the image buffer controller 132 instead of the non-sensor image source 102 including the image buffer controller 132. In still another example, the sensor image source 106 may not include the sensor 122, but instead receive a signal from the sensor 122. The system 100 may include any number of the image sources 102 and 106.

The application buffers 116, the image buffer 130, and/or the sensor image buffer 126 may be double buffered. In some examples, each of the application buffers 116, the image buffer 130, and/or the sensor image buffer 126 may be triple buffered or buffered using any number of buffers.

The system 100 may be implemented in many different ways. For example, one or more of the components in the device 121 may be included in a system on a chip (SOC). The non-sensor image source 102 may be included in the SOC. Alternatively or in addition, the sensor image source 106 may be included in the SOC. As another example, the components illustrated in FIG. 1 as being in the device 121 may be distributed across multiple devices that are physically coupled together and/or electrically coupled together.

The device 121 may include any number of the components of the system 100. Components that are integrated components, such as the integrated display 118, may be included in the device 121. Components that are external components, such as the external display 120, may not be included in the device 121.

The composition manager 128 may include hardware, such as the processor 129, and/or be implemented entirely in hardware or firmware. Alternatively, the composition manager 128 may be implemented entirely in software.

Although some components may be described as stored in computer-readable memories (for example, as logic implemented as computer-executable instructions or as data structures in memory), all or part of the system 100 and its logic and data structures may be implemented in hardware or firmware. For example, the camera service 104 may be implemented in hardware or firmware. Alternatively or in addition, all or part of the system 100 and its logic and data structures may be stored on, distributed across, or read from multiple machine-readable storage media. The machine-readable storage media may include memories, hard disks, floppy disks, CD-ROMs, or any other type computer-readable storage medium.

Alternatively or in addition, some components described as implemented in hardware or firmware may be implemented as computer-executable instructions stored in memory. For example, part of the image signal processor 124 may be implemented as computer-executable instructions stored in memory.

Some of the components, such as the applications 114, 108, 110, and 112, the camera service 104, and all or part of the composition manager 128, may be stored in a memory. The memory may hold programs and processes that implement the logic described above and be executable by a processor, such as the processor 129 of the composition manager 128 illustrated in FIG. 1.

The processor, such as the processor 129 illustrated in FIG. 1, may be one or more devices or hardware components operable to execute computer executable instructions or computer code embodied in the memory to perform the features of one or more components of the system 100. The processor may be implemented as any type of processor, such as a microprocessor, a microcontroller, a DSP, a CPU, a GPU, a display controller, an application specific integrated circuit (ASIC), discrete logic, and/or an analog or digital circuit. The computer code may include instructions executable with the processor. The computer code may be written in any computer language now known or later discovered, such as C++, C#, Java, Pascal, Visual Basic, Perl, HyperText Markup Language (HTML), JavaScript, assembly language, shell script, or any combination thereof. The computer code may include source code and/or compiled code.

The memory may be a non-volatile and/or volatile memory, such as a random access memory (RAM), a read-only memory (ROM), an erasable programmable read-only memory (EPROM), flash memory, and/or any other type of memory. The memory may include a cache, a flash drive, an optical drive, a magnetic (hard-drive) and/or any other type of data storage device. The buffers, such as the application buffers 116, the image buffer 130, and the sensor image buffer 126 may be areas of the memory or memories.

The processor may be in communication with the memory. In one example, the processor may also be in communication with additional components, such as the integrated display 118.

Figure 2:
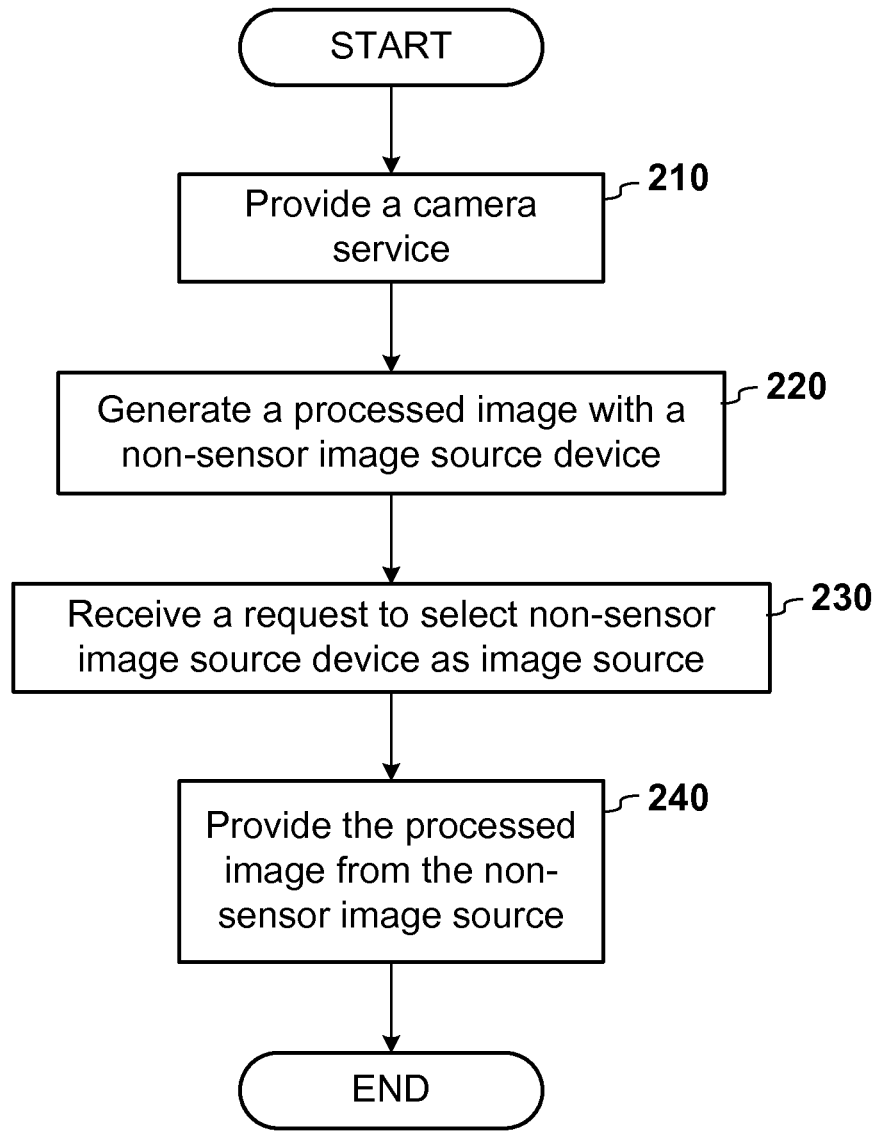
FIG. 2 illustrates a flow diagram of the logic of a system for accessing images generated by a non-sensor image source through a camera service.

FIG. 2 illustrates a flow diagram of the logic of the system 100. The logic may include additional, different, or fewer operations. The operations may be executed in a different order than illustrated in FIG. 2 and/or in parallel with each other.

At the start of the operations, the camera service 104 may be provided through which the image consuming application 108, 110, or 112 selects the non-sensor image source device as the image source from which to receive graphics content (210). For example, the camera service 104 may be stored in a memory, and/or the device 121 may be provided that includes the camera service 104.

Next, the processed image may be generated in the image buffer 130 from the application buffer 116 with the non-sensor image source device (220). The request from the image consuming application 108, 110, or 112 to select the non-sensor image source device 102 as the image source may be received by the camera service 104 (230).

The operations may end in an operation in which the processed image, which was generated by the non-sensor image source device in the image buffer 130, may be provided to the image consuming application 108, 110, or 112 through the camera service 104 based on the request to select the non-sensor image source device as the image source (240). For example, the instantiated programming object may provide the processed image to the image consuming application 108, 110, or 112 because the programming object was instantiated with the image source identifier that identifies the non-sensor image source device. Instead of the operations ending with the operation in which the processed image is provided to the image consuming application 108, 110, or 112, the operations may loop back to the start of the operations or proceed to some other operation.

All of the discussion, regardless of the particular implementation described, is exemplary in nature, rather than limiting. For example, although selected aspects, features, or components of the implementations are depicted as being stored in memories, all or part of systems and methods consistent with the disclosure may be stored on, distributed across, or read from other computer-readable storage media, for example, secondary storage devices such as hard disks, floppy disks, and CD-ROMs; or other forms of ROM or RAM either currently known or later developed. The computer-readable storage media may be non-transitory computer-readable media, which includes CD-ROMs, volatile or non-volatile memory such as ROM and RAM, or any other suitable storage device. Moreover, the various modules are but one example of such functionality and any other configurations encompassing similar functionality are possible.

Furthermore, although specific components were described in the disclosure, methods, systems, and articles of manufacture consistent with the disclosure may include additional or different components. For example, memories may be DRAM, SRAM, flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program. The components may be resident on separate hardware, such as separate removable circuit boards, or share common hardware, such as a same memory and processor for implementing instructions from the memory. Programs may be parts of a single program, separate programs, or distributed across several memories and processors.

The respective logic, software or instructions for implementing the processes, methods and/or techniques discussed above may be provided on computer-readable media or memories or other tangible media, such as a cache, buffer, RAM, removable media, hard drive, other computer readable storage media, or any other tangible media or any combination thereof. The tangible media may include various types of volatile and nonvolatile storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

To clarify the use of and to hereby provide notice to the public, the phrases "at least one of <A>, <B>, ... and <N>" or "at least one of <A>, <B>, ... <N>, or combinations thereof" or "<A>, <B>, ... and/or <N>" are defined by the Applicant in the broadest sense, superseding any other implied definitions herebefore or hereinafter unless expressly asserted by the Applicant to the contrary, to mean one or more elements selected from the group comprising A, B, ... and N, that is to say, any combination of one or more of the elements A, B, ... or N including any one element alone or in combination with one or more of the other elements which may also include, in combination, additional elements not listed.

While various embodiments have been described, it will be apparent to those of ordinary skill in the art that many more embodiments and implementations are possible within the scope of the disclosure. Accordingly, the disclosure is not to be restricted except in light of the claims and their equivalents.

What is claimed is:

1. A system comprising:
an image buffer in which a video stream from a non-sensor image source is buffered;
a processor; and
a memory comprising a camera service, the camera service executable with the processor to provide one or more image consuming applications access to a plurality of image sources through a camera application programming interface, the camera application programming interface configured to provide a unified view of the image sources and to treat each of the image sources as a camera,
the camera service executable with the processor to receive a request to select an image source from which to receive video content through the camera service,
wherein the camera service is further executable to select, based on the request, the image source from among the image sources, the image sources comprising a sensor image source and the non-sensor image source, and
wherein the camera service is further executable to provide the video stream buffered in the image buffer to an application based on a selection of the non-sensor image source as the image source.

2. The system of claim 1, wherein the application is a display driver.

3. The system of claim 1, wherein the camera service is further executable to receive an image specification parameter and to provide the video stream to the application in accordance with the image specification parameter.

4. The system of claim 3, wherein the image specification parameter comprises at least one of a location of a processed image, a size of the processed image, a color format of the processed image, a pixel format of the processed image, a timestamp of the processed image, or an availability of the processed image.

5. The system of claim 1, wherein the image buffer is a writeback buffer, wherein the writeback buffer is a buffer populated by a hardware component of a composition manager, where data stored in the writeback buffer represents a composited image for display.

6. The system of claim 1, wherein the application is a video chat application.

7. The system of claim 1, wherein the non-sensor image source includes a video decoding application.

8. The system of claim 1, wherein the non-sensor image source includes an application that generates the video stream.

9. A method comprising:
providing a camera service through which an image consuming application selects, when executed by a processor, a non-sensor image source as an image source from which to receive video content, wherein the camera service, when executed by the processor, provides the image consuming application access to a plurality of image sources through a camera application programming interface, the camera application programming interface configured to provide a unified view of the image sources and each of the image sources is viewed as a camera, the image sources comprising the non-sensor image source;
buffering a video stream in an image buffer with the processor, the video stream received by the camera service from the non-sensor image source; and
providing the video stream, which is generated by the non-sensor image source and buffered in the image buffer, to the image consuming application through the camera service based on selection of the non-sensor image source as the image source.

10. The method of claim 9 further comprising receiving, by the camera service when executed by the processor, a request from the image consuming application for the video stream in a target format, wherein providing the video stream comprises providing the video stream in the target format requested by the image consuming application.

* * * * *